(12) United States Patent
Aumann et al.

(10) Patent No.: US 12,330,406 B2
(45) Date of Patent: Jun. 17, 2025

(54) METHOD FOR HEAT-SETTING AND LAMINATING A 3D KNITTED FABRIC, LAMINATING APPARATUS, INTERIOR COMPONENT AND MOTOR VEHICLE

(71) Applicant: Bayerische Motoren Werke Aktiengesellschaft, Munich (DE)

(72) Inventors: Thomas Aumann, Buch am Erlbach (DE); Florian Dechant, Adlkofen (DE); Johann Gasslhuber, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 277 days.

(21) Appl. No.: 17/968,000

(22) Filed: Oct. 18, 2022

(65) Prior Publication Data
US 2023/0124099 A1    Apr. 20, 2023

(30) Foreign Application Priority Data
Oct. 19, 2021  (DE) .................... 10 2021 127 047.2

(51) Int. Cl.
*B32B 37/12* (2006.01)
*B32B 5/02* (2006.01)
*B32B 38/08* (2006.01)

(52) U.S. Cl.
CPC .......... *B32B 37/1207* (2013.01); *B32B 5/026* (2013.01); *B32B 38/08* (2013.01); *B32B 2037/1215* (2013.01); *B32B 2250/02* (2013.01); *B32B 2260/021* (2013.01); *B32B 2260/046* (2013.01); *B32B 2262/152* (2021.05); *B32B 2305/07* (2013.01); *B32B 2305/186* (2013.01); *B32B 2310/0806* (2013.01); *B32B 2605/003* (2013.01)

(58) Field of Classification Search
CPC ...... B32B 2605/003; B32B 2310/0806; B32B 2305/186; B32B 2305/07; B32B 2260/046; B32B 2260/021; B32B 2250/02; B32B 2037/1215; B32B 2262/152; B32B 38/08; B32B 5/026; B32B 37/1207
See application file for complete search history.

(56) References Cited

U.S. PATENT DOCUMENTS

2020/0040502 A1\*  2/2020  Aumann .................. D06C 7/02

FOREIGN PATENT DOCUMENTS

DE     10 2018 212 743 A1     2/2020

OTHER PUBLICATIONS

German-language Search Report issued in German Application No. 10 2021 127 047.2 dated May 23, 2022 with partial English translation (11 pages).

\* cited by examiner

*Primary Examiner* — Vishal I Patel
(74) *Attorney, Agent, or Firm* — Crowell & Moring LLP

(57) ABSTRACT

A method for heat-setting and laminating a 3D knitted fabric, which fabric has hot-melt adhesive yarn, on a carrier device for an interior component of a motor vehicle, includes the following steps: arranging the 3D knitted fabric on the carrier device in a laminating apparatus; activating the hot-melt adhesive yarn by way of the laminating apparatus for the heat-setting of the 3D knitted fabric; laminating the heat-set 3D knitted fabric on the carrier device by way of the laminating apparatus. A laminating apparatus for performing the heat-setting and laminating of the 3D knitted fabric on the carrier device is provided.

9 Claims, 3 Drawing Sheets

METHOD FOR HEAT-SETTING AND LAMINATING A 3D KNITTED FABRIC, LAMINATING APPARATUS, INTERIOR COMPONENT AND MOTOR VEHICLE

CROSS REFERENCE TO RELATED APPLICATION

This application claims priority under 35 U.S.C. § 119 from German Patent Application No. 10 2121 127 047.2, filed Oct. 19, 2021, the entire disclosure of which is herein expressly incorporated by reference.

BACKGROUND AND SUMMARY

The present invention relates to a method for heat-setting and laminating a 3D knitted fabric. The invention also relates to a laminating apparatus for heat-setting and laminating a 3D knitted fabric on a carrier device, to an interior component having a carrier device and at least one 3D knitted fabric, and also to a motor vehicle having at least one interior component.

In motor vehicle construction, in particular in interior construction, textiles have hitherto been used to the extent that they are cut out of 2D roll goods and further processed. In methods which are publicly known at present, the textiles are generally firstly washed after the production process in order to remove production residues. During the washing of the textiles, the materials are distorted and/or creased. In order to restore the shape of the textiles, it is necessary to smooth out the textiles in a first method step (the calibration) generally by introduction of heat. The textiles are generally then heat-set, these textiles being heated to such an extent that desired thermal reactions are triggered while they are simultaneously being shaped. In a subsequent method step (the lamination) the smoothed-out and heat-set knitted fabric is connected to a carrier component by renewed introduction of heat and, for example, by an adhesive.

Usually, 3D-knitted textiles are heat-set using hot steam in an autoclave in order to reach temperatures up to about 160° C. In this case, the hot-melt adhesive yarn liquefies and consolidates the fibers in the knitted fabric upon cooling. The heat-setting is generally an independent, energy-intensive process preceding the lamination. During the lamination, the connecting adhesive is activated by renewed energy input generally both into the carrier device and into the knitted fabric. Thus, in the value chain, at least a double input and expenditure of energy is required for the heat-setting and the lamination. Disadvantageously, between the two process steps, outlay for the handling and/or the logistics of the 3D knitted fabric is generally also required.

It is therefore an object of the present invention to remedy or at least partially remedy the above-described disadvantages in the prior art. In particular, it is an object of the invention to provide a method for heat-setting and laminating a 3D knitted fabric, said method being able to be used to heat-set and laminate a 3D knitted fabric on a carrier device in a particularly simple and cost-effective manner. In particular, it is also the object of the invention to provide a laminating apparatus for heat-setting and laminating a 3D knitted fabric on a carrier device, an interior component having a carrier device and at least one 3D knitted fabric, and also a motor vehicle having at least one interior component.

The aforementioned object is achieved by the patent claims. In particular, the object is achieved by a method for heat-setting and laminating a 3D knitted fabric, by a laminating apparatus for heat-setting and laminating a 3D knitted fabric on a carrier device, by an interior component having a carrier device and at least one 3D knitted fabric, and by a motor vehicle having at least one interior component, in accordance with the features of the independent claims. Further advantages and details of the invention will emerge from the dependent claims, from the description and from the drawings. Here, features that are described in conjunction with the method according to the invention self-evidently also apply in conjunction with the laminating apparatus according to the invention, the interior component according to the invention and the motor vehicle according to the invention, and vice versa in each case, such that reference is always or can always be made reciprocally with respect to the disclosure of the individual aspects of the invention.

According to a first aspect of the invention, the object is achieved by a method for heat-setting and laminating a 3D knitted fabric, which comprises hot-melt adhesive yarn, on a carrier device for an interior component of a motor vehicle. The method comprises the following steps:

arranging the 3D knitted fabric on the carrier device in a laminating apparatus, activating the hot-melt adhesive yarn by way of the laminating apparatus for the heat-setting of the 3D knitted fabric, laminating the heat-set 3D knitted fabric on the carrier device by way of the laminating apparatus.

In the context of the invention, heat-setting should be understood to mean the activation of the hot-melt adhesive yarn and the subsequent curing thereof for stabilizing the shape of the 3D knitted fabric. In this case, the hot-melt adhesive yarn liquefies at least in certain portions and consolidates the fibers and the position thereof relative to one another in the 3D knitted fabric upon cooling. In the context of the invention, lamination should be understood to mean the fastening of the heat-set 3D knitted fabric on the carrier device. The method according to the invention allows the 3D knitted fabric to be heat-set and the heat-set 3D knitted fabric to be laminated on the carrier device by way of only the laminating apparatus. A method designed in this way is particularly efficient in relation to the expenditure in terms of logistics, energy, time and cost.

A knitted fabric should be understood to mean an areal textile in the context of the invention. The knitted fabric is preferably formed from a front-side knitted fabric and a rear-side knitted fabric, the front-side knitted fabric and the rear-side knitted fabric preferably each being produced from a yarn or monofilament. The yarn according to the invention is in turn formed from a multiplicity of filaments. By way of example, a yarn comprises 50 to 100, in particular 70, filaments. The filaments are preferably manufactured from a plastic and/or aramid and/or a similar material. A 3D knitted fabric is manufactured in a three-dimensional manner by way of its special production process and consequently differs from a two-dimensional, flat knitted fabric both in terms of handling, manufacturing and the requirements for fastening and processing. A 3D knitted fabric preferably has closer stitches in certain portions and wider stitches in certain portions. As an alternative or in addition, a 3D knitted fabric is formed in a three-dimensional manner by way of varying numbers of stitches in adjacent stitch courses. A 3D knitted fabric is generally manufactured for the cover over a carrier component and advantageously permits processing with reduced offcuts or even without offcuts.

A joint configuration of the heat-setting and laminating method steps in the same laminating apparatus consequently advantageously means that the 3D knitted fabric does not have to be moved between various devices and the energy introduced for the heat-setting can also be utilized, at least in part, for the laminating method step, since a rapid succession of the method steps or even an at least partially simultaneous performance of the method steps is made possible by the laminating apparatus according to the invention. A method designed in this way for heat-setting and laminating a 3D knitted fabric is particularly advantageous, since a 3D knitted fabric can be heat-set and laminated on a carrier device in a particularly simple and cost-effective manner.

Unless explicitly stated otherwise, the method steps described above and those described below can be carried out individually, together, once, multiple times, simultaneously and/or in succession in any desired sequence. A designation as, for example, "first method step" and "second method step" does not determine a chronological sequence and/or prioritization.

According to a preferred further development of the invention, provision may be made in the case of a method for heat-setting and laminating the 3D knitted fabric for the activation to further comprise:
applying force to the 3D knitted fabric, in particular to the hot-melt adhesive yarn, for the activation of the hot-melt adhesive yarn by way of a force-exerting device of the laminating apparatus.

In the context of the invention, an application of force on the 3D knitted fabric should be understood to mean an application of force and/or pressure on the 3D knitted fabric, in particular the hot-melt adhesive yarn, for the activation of the hot-melt adhesive yarn by way of a force-exerting device of the laminating apparatus. The activation of the hot-melt adhesive yarn via the application of force and/or pressure during the laminating operation advantageously makes it possible to introduce a targeted melting impulse into the 3D knitted fabric, in particular into the hot-melt adhesive yarn. The force-exerting device is preferably of servomotor-driven, hydraulic and/or pneumatic design. As an alternative or in addition, the force-exerting device is designed as a suction device, a positive pressure, negative pressure and/or vacuum preferably being able to be generated at least in certain regions of the 3D knitted fabric. Furthermore, the force-exerting device is preferably formed by a plunger and/or a fluid volume.

According to a preferred further development of the invention, provision may be made in the case of a method for heat-setting and laminating the 3D knitted fabric for the method, in particular the activation, to further comprise:
controlling the temperature of the 3D knitted fabric, in particular of the hot-melt adhesive yarn, by way of a temperature device of the laminating apparatus.

Controlling the temperature of the 3D knitted fabric, in particular of the hot-melt adhesive yarn, by way of a temperature device of the laminating apparatus should preferably be understood to mean a heating operation, in particular in combination with a subsequent cooling operation of the 3D knitted fabric, in particular of the hot-melt adhesive yarn, by way of a temperature device of the laminating apparatus. Preferably, the temperature control is effected by an introduction of energy into the 3D knitted fabric and/or by a subsequent removal of energy for the cooling operation. A method designed in this way advantageously permits improved cycle times of the method steps and/or improved adhesive connections for the heat-setting and/or lamination. As an alternative or in addition, the temperature control permits an advantageous connection between the carrier device and the 3D knitted fabric.

According to a preferred further development of the invention, provision may be made in the case of a method for heat-setting and laminating the 3D knitted fabric for the method to further comprise:
impregnating the 3D knitted fabric, in particular the hot-melt adhesive yarn, with an activation medium by way of an impregnating device of the laminating apparatus, the activation medium in particular comprising an acrylate.

An activation medium preferably permits a reduction of a melting temperature of the 3D knitted fabric, in particular of the hot-melt adhesive yarn. The impregnation of the 3D knitted fabric, in particular of the hot-melt adhesive yarn, with an activation medium thus advantageously permits an increased energy efficiency of the method according to the invention. The heat-setting and/or lamination is advantageously optimized by the impregnation of the 3D knitted fabric, in particular of the hot-melt adhesive yarn, with an activation medium, since a reduced activation energy or alternative activation solutions are made possible. The 3D knitted fabric, in particular the hot-melt adhesive yarn, is preferably impregnated with an activation medium prior to the method step of arranging the 3D knitted fabric on the carrier device in the laminating apparatus.

According to a preferred further development of the invention, provision may be made in the case of a method for heat-setting and laminating the 3D knitted fabric for the activation to further comprise:
adding a catalyst medium to the 3D knitted fabric, in particular to the hot-melt adhesive yarn, for the activation of the hot-melt adhesive yarn by way of an addition device of the laminating apparatus.

As an alternative or in addition to the preceding paragraph, a catalyst medium is preferably added to the 3D knitted fabric, in particular to the hot-melt adhesive yarn, for the activation of the hot-melt adhesive yarn by way of an addition device of the laminating apparatus. The catalyst medium is preferably added to the 3D knitted fabric, in particular to the hot-melt adhesive yarn, for the activation of the hot-melt adhesive yarn by way of an addition device after the method step of arranging the 3D knitted fabric on the carrier device in the laminating apparatus. The catalyst medium preferably permits a reduction of the melting temperature of the 3D knitted fabric, in particular of the hot-melt adhesive yarn. Consequently, the addition of a catalyst medium permits an increased energy efficiency of the method according to the invention.

According to a preferred further development of the invention, provision may be made in the case of a method for heat-setting and laminating the 3D knitted fabric for the hot-melt adhesive yarn to comprise at least one first fiber composed of a first fiber material, and for the 3D knitted fabric to comprise at least one second fiber composed of a second fiber material, the first fiber material and the second fiber material being different. The first fiber material in particular is designed as a reaction partner for the second fiber material. A first fiber composed of a first fiber material and at least one second fiber composed of a second fiber material advantageously permit different properties for the respective fibers and/or for different portions of the 3D knitted fabric. Different fiber materials preferably permit different fiber properties for the hot-melt adhesive yarn and the 3D knitted fabric. The different fiber materials are preferably configured as reaction partners, in particular for the heat-setting and/or the lamination. Reaction partners should preferably be understood to mean two materials which advantageously enable and/or facilitate a thermal reaction, in particular for the heat-setting and/or the lamination, of the first fiber material and the second fiber material. In the context of the invention, the different properties of the different fibers should preferably be understood to mean different melting temperatures, colors, density, stability, stitch density, roughness, extensibility and/or thickness. A method designed in this way for heat-setting and laminating a 3D knitted fabric is particularly advantageous, since a 3D knitted fabric can be heat-set and laminated on a carrier device in a particularly simple and cost-effective manner.

According to a preferred further development of the invention, provision may be made in the case of a method for heat-setting and laminating the 3D knitted fabric for the activation to further comprise:

radiating activation radiation and/or an activation current into the 3D knitted fabric, in particular into the hot-melt adhesive yarn, for the activation of the hot-melt adhesive yarn by way of a radiating device of the laminating apparatus.

The radiating of activation radiation and/or an activation current into the 3D knitted fabric, in particular into the hot-melt adhesive yarn, for the activation of the hot-melt adhesive yarn by way of a radiating device of the laminating apparatus should preferably be understood to mean radiating UV light, IR radiation, microwaves and/or the radiating of current pulses and/or light pulses preferably for the activation of at least one chemical reaction for the heat-setting and/or the lamination. The radiating according to the invention of activation radiation and/or an activating current into the 3D knitted fabric advantageously permits a temporally defined, controllable and/or targeted pulse for the heat-setting and/or the lamination.

According to a preferred further development of the invention, provision may be made in the case of a method for heat-setting and laminating the 3D knitted fabric for the method, in particular the lamination, to further comprise:

applying force to the 3D knitted fabric and the carrier device by way of the force-exerting device of the laminating apparatus.

In the context of the invention, an application of force on the 3D knitted fabric and the carrier device by way of the force-exerting device of the laminating apparatus should preferably be understood to mean an application of force and/or pressure on the 3D knitted fabric and the carrier device for the lamination of the heat-set 3D knitted fabric on the carrier device. Any desired method of connection between the 3D knitted fabric and the carrier device is advantageously assisted by pressing the connection together at least in certain portions and/or at least periodically. An application of force according to the invention on the 3D knitted fabric and the carrier device advantageously permits a positionally accurate arrangement and/or curing of the 3D knitted fabric and the carrier device on one another and thus a precise manufactured interior component for a motor vehicle.

According to a preferred further development of the invention, provision may be made in the case of a method for heat-setting and laminating the 3D knitted fabric for the activation to further comprise:

activating a first portion of the 3D knitted fabric with a first intensity and activating a second portion of the 3D knitted fabric with a second intensity, the second intensity being higher than the first intensity.

In the context of the invention, it is advantageous if the activation and the different activation mechanisms described in the preceding paragraphs are carried out with different intensities at least periodically and/or at least in certain portions. By way of example, the further development of the invention permits different activation intensities for different regions of the 3D knitted fabric and/or for different time periods. In addition or as an alternative, the further development of the invention permits different intensities for the application of force, the temperature control, the addition of the catalyst medium, the radiating of the activation radiation and/or the activation current. In an illustrative description, it is advantageous for regions of the 3D knitted fabric with pronounced curvatures to be activated with a higher intensity in order to, for example, enable a more comprehensive melting operation of the hot-melt adhesive yarn, so as to heat-set the region of pronounced curvature in a more extensive manner. As an alternative or in addition, it is advantageous if regions between the 3D knitted fabric and the carrier device, in which regions high introductions of force are expected during the subsequent use as an interior component in a motor vehicle, are activated in a more intense manner, in order to allow improved adhesion of these regions during the lamination.

According to a second aspect of the invention, the object is achieved by a laminating apparatus for heat-setting and laminating a 3D knitted fabric on a carrier device. The laminating apparatus is designed for carrying out the method according to the first aspect. In the case of the laminating apparatus described, all of the advantages that have already been described with respect to the method according to the invention according to the first aspect of the invention are produced. A laminating apparatus designed in this way for heat-setting and laminating a 3D knitted fabric on a carrier device is particularly advantageous, since a 3D knitted fabric can be heat-set and laminated on a carrier device in a particularly simple and cost-effective manner.

According to a preferred further development of the invention, provision may be made in the case of a laminating apparatus for the laminating apparatus to comprise a force-exerting device, a temperature device, an impregnating device, an addition device, and/or a radiating device.

According to a third aspect of the invention, the object is achieved by an interior component having a carrier device and at least one 3D knitted fabric. The at least one 3D knitted fabric has been heat-set and laminated on the carrier device by the method according to the first aspect. In the case of the interior component described, all of the advantages that have already been described with respect to the method according to the invention according to the first aspect of the invention are produced. Preferably, the heat-setting and lamination according to the invention is effected by the method according to the first aspect in a laminating apparatus according to the second aspect.

According to a fourth aspect of the invention, the object is achieved by a motor vehicle having at least one interior component. The at least one interior component is designed according to the third aspect. In the case of the motor vehicle described, all of the advantages that have already been described with respect to the method according to the invention according to the first aspect of the invention are produced. A motor vehicle designed in this way with at least one interior component having a carrier device and at least one 3D knitted fabric is particularly advantageous, since the 3D knitted fabric can be heat-set and laminated on the carrier device of the interior component in a particularly simple and cost-effective manner.

A method according to the invention for heat-setting and laminating a 3D knitted fabric, a laminating apparatus for heat-setting and laminating a 3D knitted fabric on a carrier device, an interior component and a motor vehicle will be explained in more detail below with reference to drawings.

Other objects, advantages and novel features of the present invention will become apparent from the following detailed description of one or more preferred embodiments when considered in conjunction with the accompanying drawings.

Figure 1:
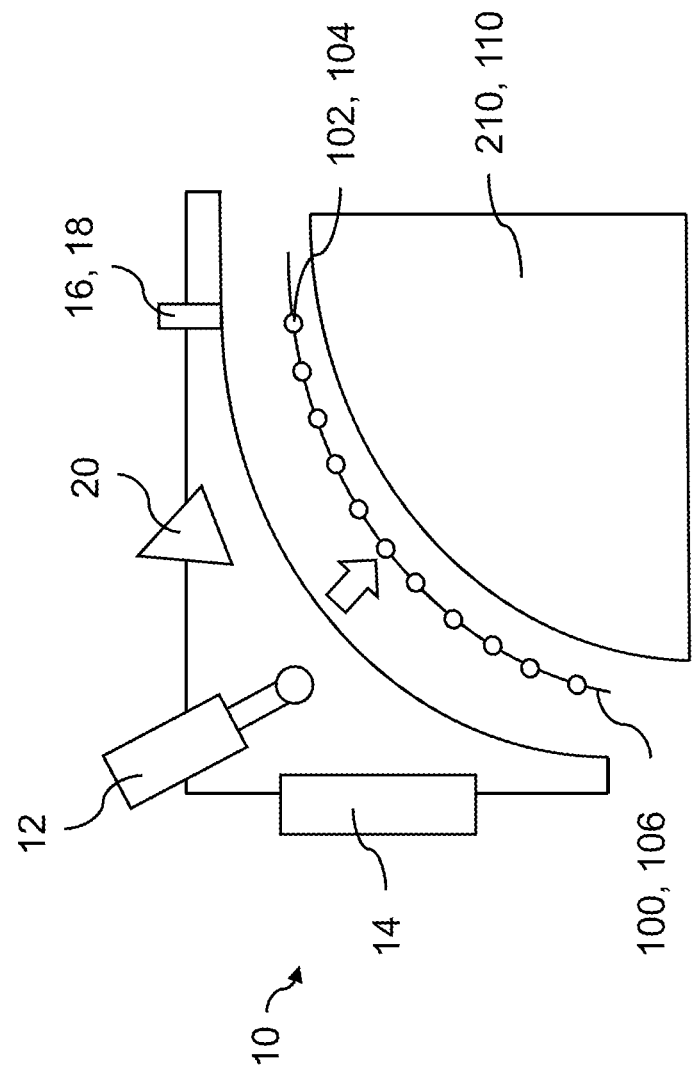
FIG. 1 is a schematic sectional side view of a laminating apparatus for carrying out the method according to the invention, comprising a force-exerting device, a temperature device, an impregnating device, an addition device and a radiating device.
Figure 2:
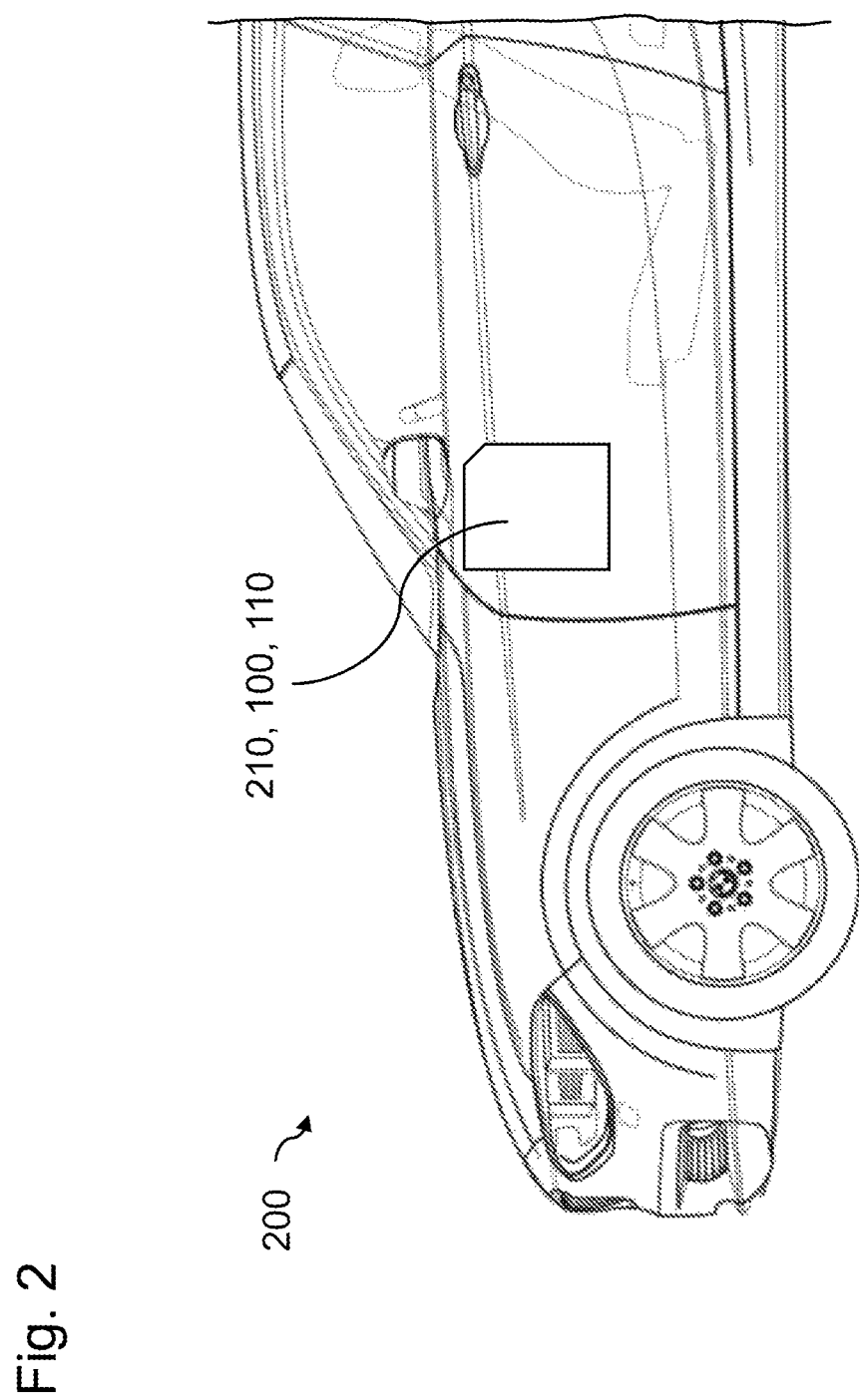
FIG. 2 is a perspective side view of a motor vehicle with an interior component with a 3D knitted fabric.
Figure 3:
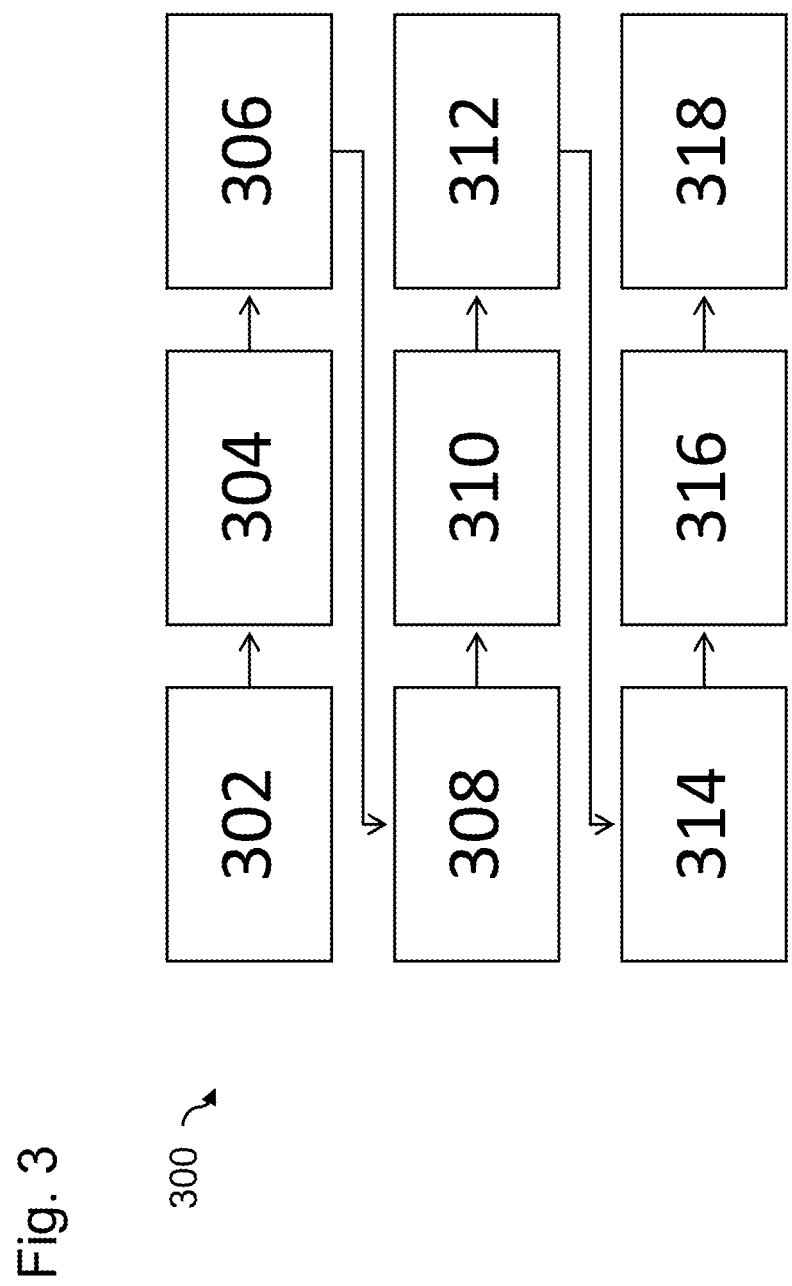
FIG. 3 is a flow diagram of a method according to the invention.

Elements with identical function and mode of operation are each provided with the same reference signs in FIGS. 1 to 3.

DETAILED DESCRIPTION OF THE DRAWINGS

FIG. 1 schematically shows a sectional side view of a laminating apparatus 10 for carrying out a method 300 for heat-setting and laminating a 3D knitted fabric. The laminating apparatus includes a force-exerting device 12, a temperature device 14, an impregnating device 16, an addition device 18, and a radiating device 20. The force-exerting device 12 of the laminating apparatus 10 is designed for applying force 308 (not shown) to the 3D knitted fabric 100 and to the hot-melt adhesive yarn 102 for the activation 304 (not shown) of the hot-melt adhesive yarn 102. The temperature device 14 of the laminating apparatus 10 is designed for controlling the temperature 314 (not shown) of the 3D knitted fabric 100 and of the hot-melt adhesive yarn 102. The impregnating device 16 of the laminating apparatus 10 is designed for impregnating 310 (not shown) the 3D knitted fabric 100 and the hot-melt adhesive yarn 102 with an activation medium, the activation medium comprising an acrylate. The addition device 18 of the laminating apparatus 10 is designed for adding 312 (not shown) a catalyst medium to the 3D knitted fabric 100 and to the hot-melt adhesive yarn 102 for the activation 304 (not shown) of the hot-melt adhesive yarn 102. The hot-melt adhesive yarn 102 comprises a first fiber 104 composed of a first fiber material, and the 3D knitted fabric 100 comprises a second fiber 106 composed of a second fiber material, the first fiber material and the second fiber material being different. The radiating device 20 of the laminating apparatus 10 is designed for radiating 316 (not shown) activation radiation and an activation current into the 3D knitted fabric 100 and into the hot-melt adhesive yarn 102 for the activation 304 (not shown) of the hot-melt adhesive yarn 102.

FIG. 2 schematically shows a perspective side view of a motor vehicle 200 with an interior component 210 with a 3D knitted fabric 100. A motor vehicle 200 designed in this way with at least one interior component 210 having a carrier device 110 and at least one 3D knitted fabric 100 is particularly advantageous, since the 3D knitted fabric 100 can be heat-set and laminated on the carrier device 110 of the interior component 210 in a particularly simple and cost-effective manner.

FIG. 3 schematically shows a flow diagram of the method 300. In a first method step, the method 300 comprises arranging 302 the 3D knitted fabric 100 on the carrier device 110 in a laminating apparatus 10. In a further method step, the method 300 comprises activating 304 the hot-melt adhesive yarn 102 by way of the laminating apparatus 10 for the heat-setting of the 3D knitted fabric 100. In a further method step, the method 300 comprises laminating 306 the heat-set 3D knitted fabric 100 on the carrier device 110 by way of the laminating apparatus 10. In a further method step, the method 300 comprises applying force 308 to the 3D knitted fabric 100, in particular to the hot-melt adhesive yarn 102, for the activation 304 of the hot-melt adhesive yarn 102 by way of a force-exerting device 12 of the laminating apparatus 10. In a further method step, the method 300 comprises controlling the temperature 314 of the 3D knitted fabric 100, in particular of the hot-melt adhesive yarn 102, by way of a temperature device 14 of the laminating apparatus 10. In a further method step, the method 300 comprises impregnating 310 the 3D knitted fabric 100, in particular the hot-melt adhesive yarn 102, with an activation medium by way of an impregnating device 16 of the laminating apparatus 10, the activation medium in particular comprising an acrylate. In a further method step, the method 300 comprises adding 312 a catalyst medium to the 3D knitted fabric 100, in particular to the hot-melt adhesive yarn 102, for the activation 304 of the hot-melt adhesive yarn 102 by way of an addition device 18 of the laminating apparatus 10. In a further method step, the method 300 comprises radiating 316 activation radiation and/or an activation current into the 3D knitted fabric 100, in particular into the hot-melt adhesive yarn 102, for the activation 304 of the hot-melt adhesive yarn 102 by way of a radiating device 20 of the laminating apparatus 10.

In a further method step, the method 300 comprises applying force 318 to the 3D knitted fabric 100 and to the carrier device 110 by way of the force-exerting device 12 of the laminating apparatus 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

10 Laminating apparatus
12 Force-exerting device
14 Temperature device
16 Impregnating device
18 Addition device
20 Radiating device
100 3D knitted fabric
102 Hot-melt adhesive yarn
104 First fiber
106 Second fiber
110 Carrier device
200 Motor vehicle
210 Interior component
300 Method
302 Arranging
304 Activation 306 Lamination
308 Application of force
310 Impregnation
312 Addition
314 Controlling of the temperature
316 Radiating
318 Application of force

What is claimed is:

1. A method for heat-setting and laminating a knitted fabric on a carrier device for an interior component of a motor vehicle, the method comprising the steps of:
    arranging a 3D knitted fabric on the carrier device in a laminating apparatus, the 3D knitted fabric comprising a hot-melt adhesive yarn;
    heat-setting the 3D knitted fabric by activating the hot-melt adhesive yarn by way of the laminating apparatus; and
    laminating the heat-set 3D knitted fabric on the carrier device by way of the laminating apparatus.

2. The method according to claim 1, wherein the activating further comprises:
    applying force to the hot-melt adhesive yarn of the 3D knitted fabric for activating the hot-melt adhesive yarn, by way of a force-exerting device of the laminating apparatus.

3. The method according to claim 1, wherein the method further comprises:
    controlling a temperature of the hot-melt adhesive yarn of the 3D knitted fabric, by way of a temperature device of the laminating apparatus.

4. The method according to claim 1, wherein the method further comprises:
    impregnating the 3D knitted fabric with an activation medium by way of an impregnating device of the laminating apparatus, the activation medium comprising an acrylate.

5. The method according to claim 1, wherein the activating further comprises:
    adding a catalyst medium to the 3D knitted fabric for activating the hot-melt adhesive yarn, by way of an addition device of the laminating apparatus.

6. The method according to claim 1, wherein
    the hot-melt adhesive yarn comprises at least one first fiber composed of a first fiber material, and
    the 3D knitted fabric comprises at least one second fiber composed of a second fiber material,
    the first fiber material and the second fiber material are different, and
    the first fiber material is designed as a reaction partner for the second fiber material.

7. The method according to claim 1, wherein the activating further comprises:
    radiating activation radiation and/or an activation current into the 3D knitted fabric for activating the hot-melt adhesive yarn, by way of a radiating device of the laminating apparatus.

8. The method according to claim 1, wherein the laminating further comprises:
    applying force to the 3D knitted fabric and the carrier device, by way of a force-exerting device of the laminating apparatus.

9. The method according to claim 1, wherein the activating further comprises:
    activating a first portion of the 3D knitted fabric with a first intensity and activating a second portion of the 3D knitted fabric with a second intensity, the second intensity being higher than the first intensity.

* * * * *